(12) United States Patent
Yau (10) Patent No.: US 6,196,081 B1
(45) Date of Patent: Mar. 6, 2001

(54) SYSTEMS AND METHODS EMPLOYING A ROTARY TRACK FOR MACHINING AND MANUFACTURING

(75) Inventor: Chi Lam Yau, Hampton, NH (US)

(73) Assignee: Hexel Corporation, Portsmouth, NH (US)

( * ) Notice: Subject to any disclaimer, the term of this patent is extended or adjusted under 35 U.S.C. 154(b) by 0 days.

(21) Appl. No.: 09/243,692

(22) Filed: Feb. 3, 1999

Related U.S. Application Data (60) Provisional application No. 60/073,515, filed on Feb. 3, 1998.

(51) Int. Cl.[7] .............................. B25J 17/02; G05G 11/00
(52) U.S. Cl. ..................................... 74/479.01; 74/490.06; 248/651; 901/29
(58) Field of Search ........................... 74/479.01, 490.06; 248/651, 653, 654; 901/29

(56) References Cited

U.S. PATENT DOCUMENTS

| 4,536,690 | * | 8/1985 | Belsterling et al. | 318/687 |
| 4,790,053 | * | 12/1988 | Godbecker | 29/42 |
| 5,378,282 | | 1/1995 | Pollard | 118/697 |
| 5,575,597 | | 11/1996 | Bailey et al. | 409/201 |

FOREIGN PATENT DOCUMENTS

| 0 263 627 A1 | 4/1988 | (CH) . |
| 0 668 130 A1 | 8/1995 | (CH) . |
| 602 289 | 3/1936 | (DE) . |
| 197 01 820 A1 | 8/1997 | (DE) . |
| WO 97/22436 | 6/1997 | (WO) . |

* cited by examiner

Primary Examiner—Allan D. Herrmann
(74) Attorney, Agent, or Firm—Edward J. Kelly; Pierce Atwood; Chris A. Caseiro (57) ABSTRACT

The systems and methods described herein include hexapod systems, Stewart platform systems and other mechanical movement systems, in which a set of independently moveable trucks support legs that couple to a working surface capable of holding a machine tool or other end-effector, and preferably wherein the trucks travel across a reference surface, such as around the circumference of a circle or along some other pre-defined geometrical pattern or track. For example, as described herein, the systems include Stewart platform machines that have six supportive legs each of which connects to a truck that can travel independently along a track. By coordinating the movement of these six trucks, the working surface can be moved in three dimensional space and can be oriented about three axes, providing control of roll, pitch and yaw.

14 Claims, 8 Drawing Sheets

SYSTEMS AND METHODS EMPLOYING A ROTARY TRACK FOR MACHINING AND MANUFACTURING

This application claims benefit to Provisional application Ser. No. 60/073,515 filed Feb. 3, 1998.

TECHNICAL FIELD

The invention relates to devices for manufacturing and machining, particularly devices that include a movable platform for positioning a tool in space.

BACKGROUND OF THE INVENTION

High precision automated manufacturing, such as computer aided manufacturing (CAM), requires that the position of a tool be precisely known in space. However, most machine tools today fail to provide the necessary precision, in part due to their limited range of movement, high cost, inability to recognize their own work space to plan complex motion activity, and unrealistically high expectations of technical expertise available for the users of CAM software. To overcome these problems, engineers have developed mechanical movement systems that include a movable platform that is mounted with substantial freedom in translation and rotation by means of a plurality of legs the length and angular orientation of which are controllably adjustable. Through coordinated control of the effective length of the legs, the platform can be precisely moved through space. A tool can be mounted on to the platform and carried thereby to a precisely selected position and orientation. One such system is described in U.S. Pat. No. 5,575,597 entitled Mechanical Manipulator, the teachings of which are herein incorporated. As shown therein, one such movable platform system has three pairs of supportive legs coupled to a platform at triangularly spaced-apart locations by means of three universal joints each of which couples to one end of each of the two legs of the respective pair, and the two legs of each pair extend from their respective universal joint in divergent directions to spaced-apart locations in a mounting where each leg is drivingly engaged by a motor for moving the leg in its own longitudinal direction, thereby changing the effective length of the leg. Six such motors are mounted at spaced-apart locations in the mounting in a manner such as to accommodate the pivotal movements of the legs that will accompany their effective length variations.

Each pair of legs thus defines a triangle of support for the platform with the apex of the triangle coupled to the platform by means of the universal joint, the base of the triangle defined by the separation between the mounted motors which drive the respective legs, and the effective lengths of the legs being independently adjustable by operation of the motors. With the platform supported by three such support triangles and the effective lengths of all six legs independently adjustable, the position and orientation of the platform becomes infinitely adjustable within the limits of accommodation of the universal joints and the motor-mountings. Thus the tool mounted to the platform can be positioned with high precision and moved with a great range of freedom.

Although these movable structures can work well, the supportive leg assemblies are generally quite complex, costly and difficult to manufacture. Moreover, the complexity of the legs, typically including inter-locking members, are subject to problematic thermal expansion, that can change the length of the extension arm and therefore interfere with the accurate placement of the point on the platform. In addition, these structures have limits within which the platform may be positioned and oriented. To achieve rotational orientation about an axis perpendicular to their platforms, these systems generally require that the platform carry an additional rotational stage with an additional motor or other actuator.

OBJECTS AND SUMMARY OF THE INVENTION

It is an object of the invention to provide systems and methods that provide improved platform systems which are facile to manufacture, which can have reduced thermal expansion and which can achieve greater ranges of positioning and orientation.

The systems and methods described herein include hexapod systems, Stewart platform systems and other mechanical movement systems, in which a set of independently moveable trucks support legs that couple to a working surface capable of holding a machine tool or other end-effector, and preferably wherein the trucks travel across a reference surface, such as around the circumference of a circle or along some other pre-defined geometrical pattern or track. For example, as described herein, the systems include Stewart platform machines that have six supportive legs each of which connects to a truck that can travel independently along a track. By coordinating the movement of these six trucks, the working surface can be moved in three dimensional space and can be oriented about three axes, providing control of roll, pitch and yaw. It will be apparent to one of ordinary skill in the art that although the illustrated embodiments comprise a track system upon which a set of six trucks travel independently, any system capable of allowing the trucks to move independently for selectively positioning and orienting a platform within space will be understood to fall within the scope of the invention described herein.

Accordingly, the systems described herein provides for the positioning and orientation of a working surface by the coordinated movement of supportive legs. This movement may be in one, two or three dimensions, and is not confined to movement effective to alter the effective length of the legs. This system may be further combined with a system for altering the effective length of some or all of the legs, such that positioning and orientation of the working surface is achieved by coordinated movement of the position of the legs in addition to the coordinated control over the effective length of some or all of the legs.

Certain illustrative embodiments are provided herein for purposes of describing the systems and methods of the invention. The embodiments depicted are merely illustrative and are not to be understood as exhaustive or limiting in any way. Like reference numerals refer to like elements.

BRIEF DESCRIPTION OF THE ILLUSTRATED EMBODIMENTS

DETAILED DESCRIPTION OF THE ILLUSTRATED EMBODIMENTS

The invention includes movement systems that have a working surface coupled to and supported by a set of legs, the positioning of which are effective to position and orient the working surface. Such movement systems include, for example, hexapod structures that employ a rotary track for controlling the relative position of a set of legs (also known as push rods or radial struts) which support a platform, or utility plate, having a working surface to which a tool or other end-effector can be mounted. In particular, FIG. 1 depicts a machine 10 that includes a plurality of strut-end universal joints 12, a support structure 14, a plurality of spokes 16, a hub 18, a plurality of push rods 20, a plurality of bi-strut universal joints 22, a utility plate 24, a gear ring 26 and a plurality of gear box transmission assemblies 28, each of which include a motor 30, a cam follower 32 and a position feedback system 33.

Figure 1:
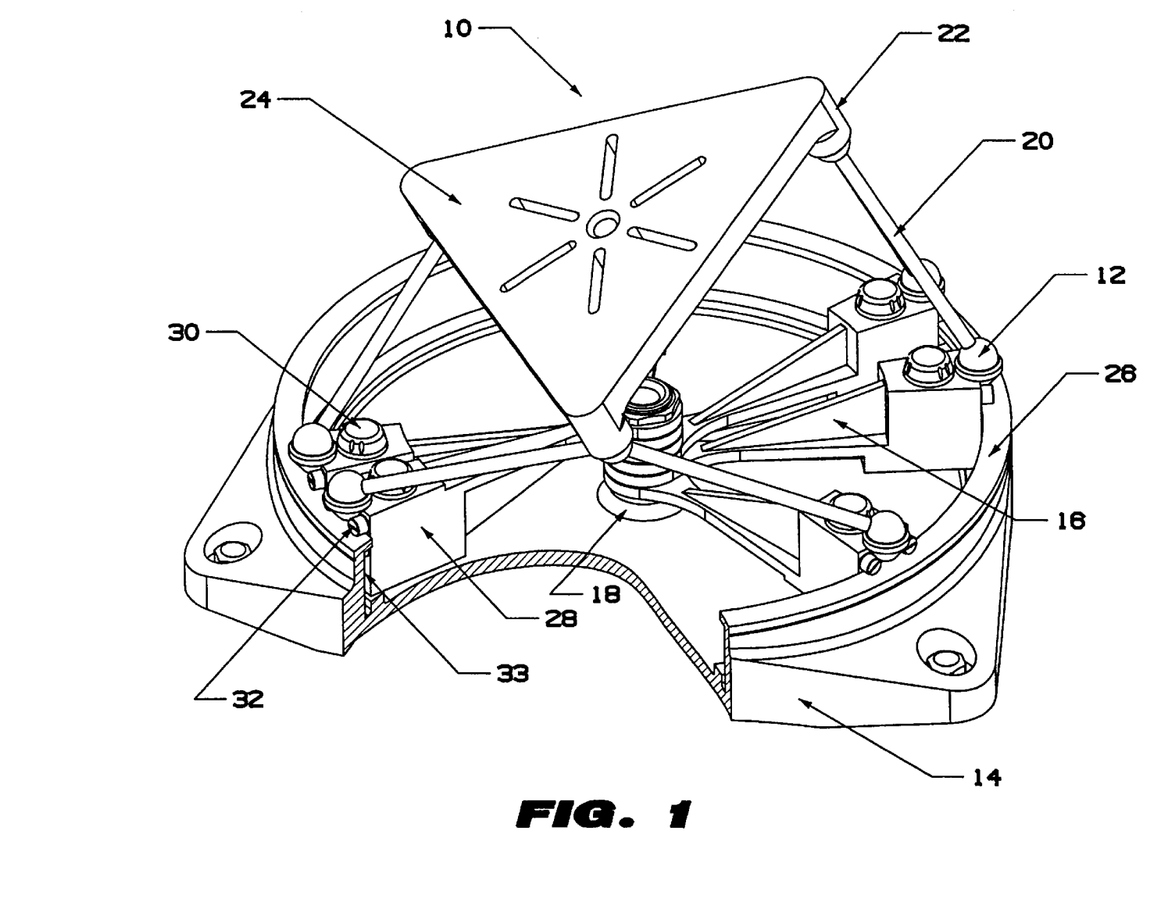
FIG. 1 depicts one embodiment of a system having a rotary track and a working surface that is positioned and oriented by legs carried by trucks moveably coupled to the rotary track.

FIG. 1 further depicts that the utility plate 24 is supported by a plurality of strut assemblies, each of which generally comprises a bi-strut universal joint 22, a push rod 20 and a strut-end universal joint 12. As further shown by FIG. 1, each bi-strut universal joint 22 connects to the utility plate 24. The depicted bi-strut universal joints 22 each connect to one corner of the depicted triangular utility plate 24. Other configurations of plates and connection points could be employed. Each bi-strut universal joint 22 couples to two push rods 20, each push rod 20 being coupled to a separate strut-end universal joint 12. The strut-end universal joints 12 each connect to a corresponding gear box transmission assembly 28, which in turn connects to a corresponding spoke 16. Each depicted spoke 16 can couple rotatably to the hub 18. The hub 18 of FIG. 1 is centrally located within the center of the support structure 14 which, in the depicted embodiment, is at the center of a circle defined by the gear ring 26 carried on top of the support structure 14. Although the depicted embodiment depicts six strut assemblies acting as supportive legs, it should be apparent that other embodiments can employ more or fewer legs strut assemblies.

In the depicted embodiment, each strut-end universal joint 12 connects to a movable truck that comprises a gear box transmission assembly 28 and a spoke 16. Accordingly, the truck includes elements for moving along the gear ring 26 to a selected position, and each truck can be moved independently. Moreover, each truck can be moved to any position along the gear ring 26. Therefore, coordinated movement of the trucks along the gear ring 26 provides unlimited yaw of the utility plate 24. In particular, each of the gear box transmission assemblies 28 couples, in part, by way of the cam followers 32 to the gear ring 26 carried on the support structure 14. A motor 30 is secured inside each of the gear box transmission assemblies 28 which drivingly engages the gear ring 26 and thereby moves the truck along the gear ring 26 and about the hub 18. In this way, the machine 10 is actuated by action of the motors 30, each of which is coupled to a separate one of the six spokes. Accordingly, each of the trucks can move independently to a selected position along the gear ring 26.

As each truck, with its spoke 16 and gear box transmission assembly 28, moves along the gear ring 26, its position can be determined via the position feedback system 33, either by itself or in combination with a computer control system (not shown) that may be coupled to one or more of the positioned feedback systems 33. In this way the precise position of each of the gear box transmission assemblies 28 along the gear ring 26 can be determined. Accordingly, the coordinated positioning of two gear box assemblies 28 that are coupled to corresponding strut assemblies which in turn are coupled to the same bi-strut universal joint 22, constrains the position of one corner of the depicted utility plate 24. By coordinating the position of the six trucks along the gear ring 26, the position and orientation of the utility plate 26 can be selected. As a result, the central location of the utility plate 24 can be positioned anywhere within X, Y, and Z space as well as oriented about yaw, pitch, and roll axes, with an unlimited amount of yaw rotation.

Accurate positioning of the trucks along the gear ring 26, and thus the position and orientation of the utility plate 24, can be achieved with closed-loop control. For example, the embodiment of FIG. 1 includes a position feedback system 33 for generating a feedback signal based on the position of the gear box transmission assembly 28 along the gear ring 26. This provides information as to the location of the respective strut-end universal joint 12 along the circumference of the gear ring 26. The position data upon which this signal is based can be derived in a variety of ways, including the use of a set of markers positioned along the gear ring 26 or support structure 14 to provide absolute or relative position reference points. These reference points may be provided by Renishaw tape, glass scale encoders, etchings in the gear ring 26 or support structure or any other optical, mechanical, magnetic or other position-indicating feature. Alternatively, the position of a truck may be determined based on its angle of rotation about the hub 18. In such an embodiment, position data can similarly be derived from optical encoders or other rotation-indicating features. In another embodiment, the position feedback signals can be generated based on the rotation of the output shafts of the motors 30. Further embodiments provide position feedback signals based on the position and/or orientation of the utility plate 24 or of structures coupled thereto. Such signals may be derived from a computer vision system, laser range finders or other devices for measuring distances or positions.

For these and other embodiments capable of generating position feedback signals, closed-loop control of truck positioning may be achieved by providing the feedback signals to a computer, electrical circuit or other device capable of directly or indirectly activating one or more motors 30 so as to drive the corresponding truck to the desired position along the gear ring 26. Such computer, circuit or device may be carried by one or more trucks, mounted on the machine 10 or located remotely.

Alternatively, open-loop control of the position of the trucks may be achieved through various means known to those skilled in the art of motion control systems. One such embodiment would resemble that shown in FIG. 1, with the omission of the position feedback system 33 and wherein the motors are stepper motors. In such an embodiment, one or more computers, controllers or other devices send, directly or indirectly, electrical impulses to the motors. By keeping track of the impulses sent to each motor, the position of each truck may be determined. In still further embodiments, the systems described herein can include control systems with both open and closed loop control.

The gear ring 26 depicted in FIG. 1 is formed as a circular track so that a truck equipped with cam followers, such as the cam followers 32, can ride along the track to a selected position on the gear ring 26. It should be understood by one of ordinary skill in the art however that any type of track can be employed by the present invention without departing from the scope thereof. Moreover, it should be understood by one of ordinary skill in the art that shapes other than circles can be employed with the systems and methods described herein. By way of example, the spokes may be extendable or otherwise mounted so as to enable the trucks to follow a non-circular track. The track also need not be co-planar, and not all trucks must travel along the same track. One of many possible embodiments provides a plurality of concentric circular tracks where the planes defined by each track are parallel but spaced-apart.

As depicted in FIG. 1, each moveable truck consists of a spoke 16 and a gear box transmission assembly 28 and rides on cam followers 32 along a gear ring 26. It should be understood by one of ordinary skill in the art however that any type of truck capable of carrying and positioning a strut-end universal joint 12 is contemplated by the invention. For instance, the truck may comprise a two-axis stepper motor capable of traveling two-dimensionally across a metal plate, where the motor is coupled to the metallic plate by magnetic fields and an opposing air bearing. This and other embodiments provide independent two-dimensional positioning of each truck rather than constraining the trucks to follow predefined paths. Each truck may instead comprise a linear motor running along separate, partial, undulating or shared linear or curved tracks. Though not necessarily providing unlimited yaw, such embodiments do provide control of the three-dimensional position and orientation of the utility plate 24. Further embodiments provide for three-dimensional control of the position of each truck, whereby each truck is moved throughout a volume of space and is not limited to a predefined path or surface. In addition, any actuator or actuator system capable of moving the trucks throughout the respective path, surface or volume may be employed. For instance, the motor 30 of FIG. 1 may be embodied by a rotary or linear motor, by a servo or stepper motor, by a hydraulic or pneumatic actuator or by any other suitable actuator. Similarly, the trucks may be propelled along the track not only by a motor coupled to the gear ring 26 of FIG. 1, but also by a system of tensioning cables for pulling the trucks along a track, by a rotary actuator for rotating the trucks about a hub or by other suitable actuating systems.

It will be apparent that the bi-strut universal joints 22 and the strut-end universal joints 12 may be embodied by any joint suitable for providing a gimbal joint. These include, for instance, universal joints, gimbals, ball-and-socket joints and the like. By way of example, the bi-strut universal joints 22 may be embodied by ball-and-socket joints having two concentric balls located within a single socket.

It should also be recognized by one skilled in the art that each one or more of the strut-end universal joints 12 may be replaced by a drive motor mounted in a gimbal carried by a truck. In such an embodiment, each drive motor drivingly engages one of the legs, or push rods, and is capable of moving that leg in the direction of the length of the leg. Each drive motor is thereby capable of controlling the effective length of the respective leg, i.e. the distance between the gimbal and the bi-strut universal joint associated with that leg. Accordingly, the present invention contemplates a movement system capable of positioning and orienting a reference surface by the coordinated control of the effective length of each leg, wherein the gimbals which define an effective end of each leg are themselves controllably positioned by trucks.

Figure 2A:
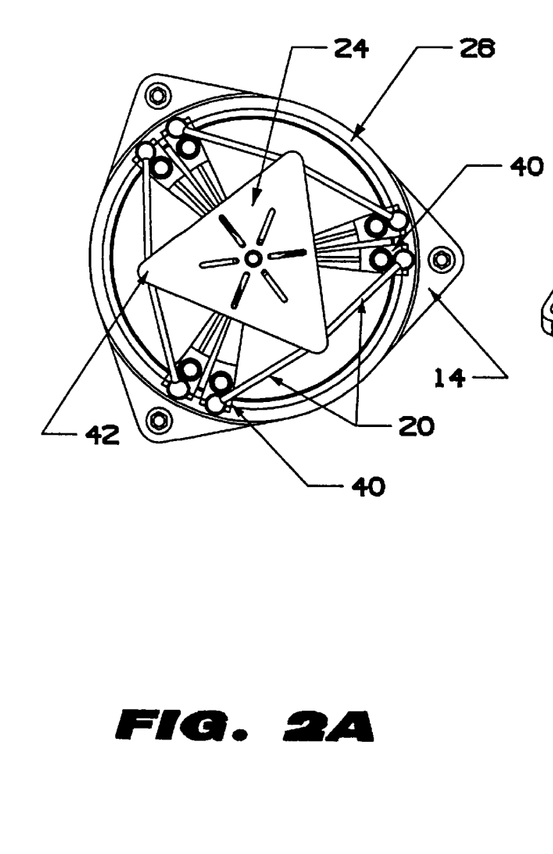
FIGS. 2A–2C depict the embodiment of FIG. 1 wherein the working surface is in a parallel orientation relative to a reference surface defined by the rotary track.
Figure 2B:
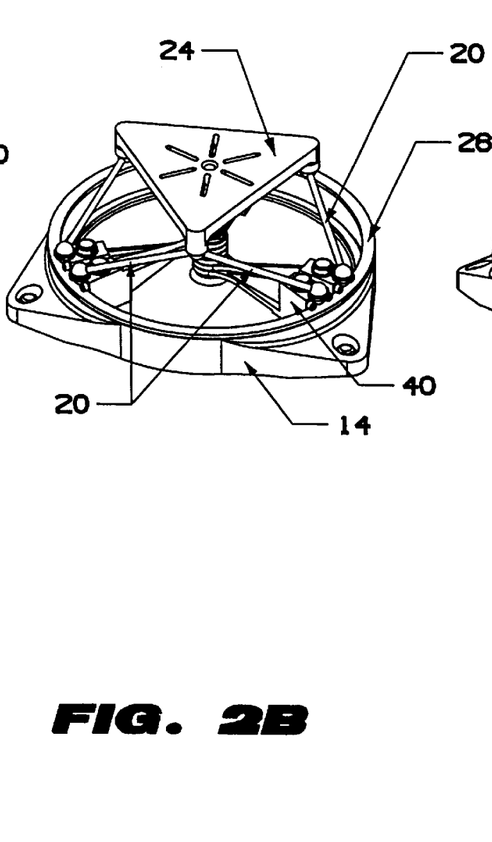
Figure 2C:
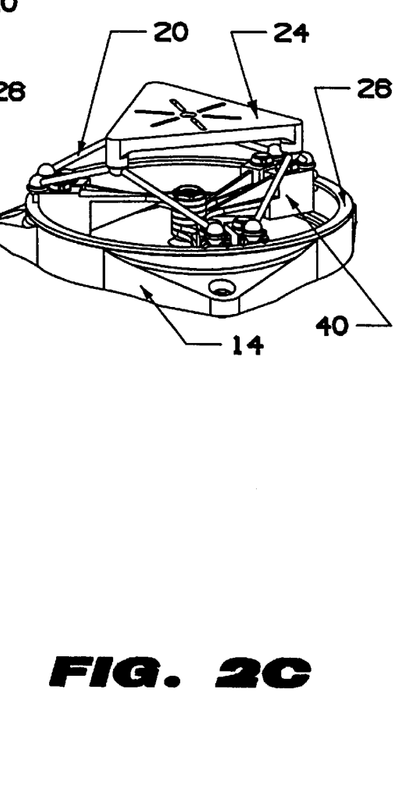

FIGS. 2A–2C depict the machine 10 shown in FIG. 1 from alternate perspectives wherein the utility plate 24 is in a parallel orientation and a lowered position. As can be seen, the pair of trucks coupled to each bi-strut universal joint 6 are in spaced-apart configurations.

More specifically, FIGS. 2A–2C depict from different perspectives the utility plate 24 supported by the six pushrods 20 that extend upward from the support structure 14 and connect to the comers of the triangular plate 24. More specifically, FIG. 2 depicts that each corner of the triangular plate 24 couples to a pair of pushrods 20 and to a pair of trucks 40. Each of the depicted trucks shown in FIGS. 2A–2C are understood to comprise an assembly of the motor 30, gear box transmission 28, position feedback system 33 and other elements of the system 10 depicted in FIG. 1. Each of the trucks 40 is independently moveable along the gear ring 26. Accordingly, relative movement of the trucks 40, changes the position of a corner, depicted as a node 42, of the plate 24. As is well know with Stewart platforms, the position and orientation of the plate 24 is defined by the relative positions of the three nodes 42 of the plate 24. The positioning and orienting of a platform such as the depicted platform 24 is well-known in the art, such as in the development of flight simulators that employ hexapod like structures for moving a platform through space with six degrees of freedom. Stewart, D. A Platform With Six Degrees of Freedom, Proc. Roc. of the Institute of Mechanical Eng., 180 (part 1, 15): 371/386 (1965). Accordingly, it is understood that the positioning of the three nodes 42 allows for orienting and disposing the platform 24 in a selected disposition.

Figure 3A:
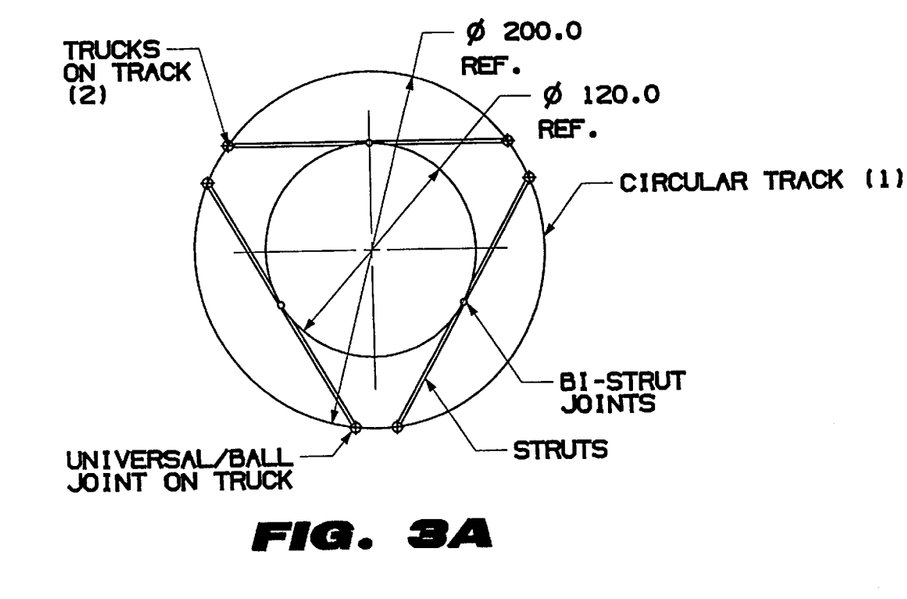
FIGS. 3A–3D depict schematically an embodiment of the invention having a working surface supported by a plurality of legs wherein the reference surface is in a parallel orientation and lowered position relative to a reference surface defined by a rotary track.
Figure 3B:
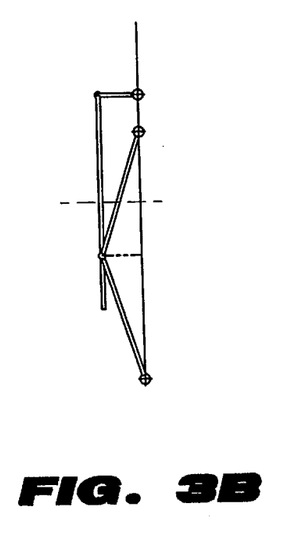
Figure 3C:
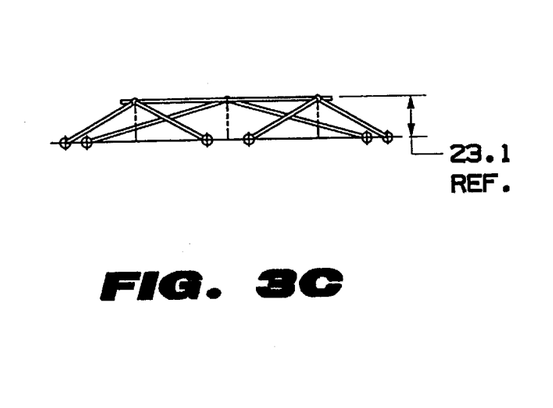
Figure 3D:
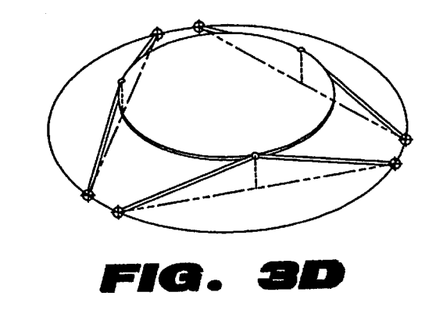
Figure 4A:
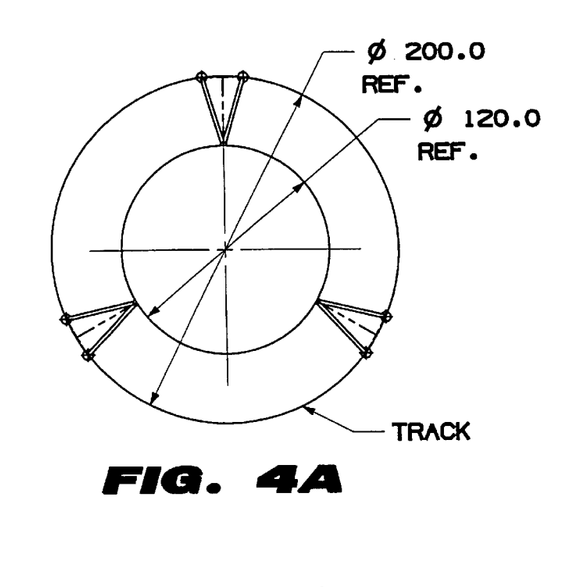
FIGS. 4A–4D depict schematically the embodiment of FIGS. 3A–3D wherein the working surface is in a parallel orientation and raised position relative to the reference surface.
Figure 4B:
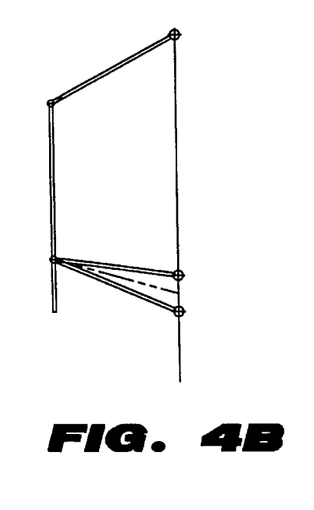
Figure 4C:
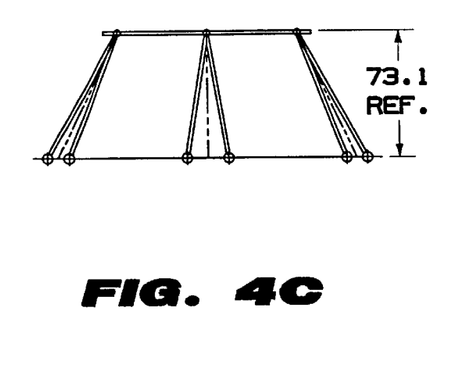
Figure 4D:
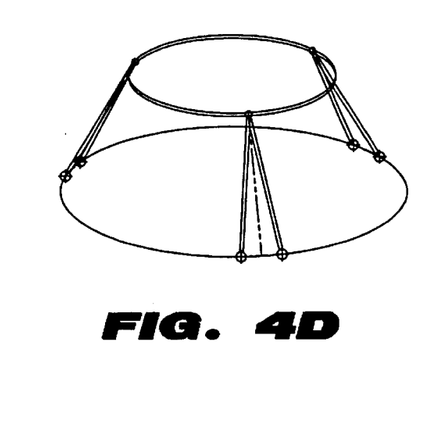

For example, FIGS. 3A–3D depict schematically a utility plate, such as the utility plate 24 depicted in FIG. 1, as supported by three pairs of strut assemblies, each comprising a pair of push rods coupled via movable truck to a circular track. The strut assemblies are positioned in a manner similar to that depicted in FIGS. 2A–2C. As shown, the utility plate is essentially located above the circular track and raised slightly above the surface of the circular track. Accordingly, moving the truck elements to the positions depicted in FIGS. 3A–3D provides for a disposition of the utility plate that raises the utility plate moderately above the circular track and orients it in a disposition parallel to the circular track. As shown in FIG. 3D, each of the truck elements is spaced apart substantially the same distance from the point projected onto the plane of the circular track by the node 42 of the plate. Accordingly, with the trucks so located, the depicted orientation of the plate can be achieved. However, it will also be understood that as each truck is moveable both independently and in coordinated action, the system depicted in FIG. 3D does not have to maintain a static position, but can maintain its relative disposition in space while rotating about a central access that extends through the center of the circular track. Accordingly, the plate can be made to rotate by having the trucks travel in coordinated motion either clockwise or counterclockwise around the circular track. Accordingly, it will be understood that the systems described herein provide for selecting the orientation and disposition of a plate in space while providing unlimited yaw for the disposed plate.

FIGS. 4A–4D depict vertical translation of the plate by actuation of the moveable trucks. Specifically, FIGS. 4A–4D depict the utility plate raised above the central location of the circular track. As can be seen by comparing FIGS. 4A–4D to FIGS. 3A–3D, the proximal ends of each push rod pair, i.e. push rods that are coupled to a common bi-strut universal joint, are brought closer together by movement of the trucks along the circular track. As can be seen by FIGS. 4A–4D, this provides for vertical translation of the plate along an axis that extends through the center of a reference frame associated with the circular track. In operation, the vertical translation of the plate can be achieved by raising each node of the plate independently, or by raising each of the nodes simultaneously. It will also be understood, that FIGS. 4A–4D compared with FIGS. 3A–3D also show that the utility plate can be vertically translated from a higher disposition to a lower disposition by spacing the pairs of associated trucks farther apart along the circular track.

It will be understood that the exact positioning of the trucks along the circular track to achieve the selected disposition of the plate, follows in part from a calibration procedure, that is commonly employed with Stewart plates, to take into consideration any disparities in the length of push rods, ball joints, or any other components that form the support platform for the plate 24.

Figure 5A:
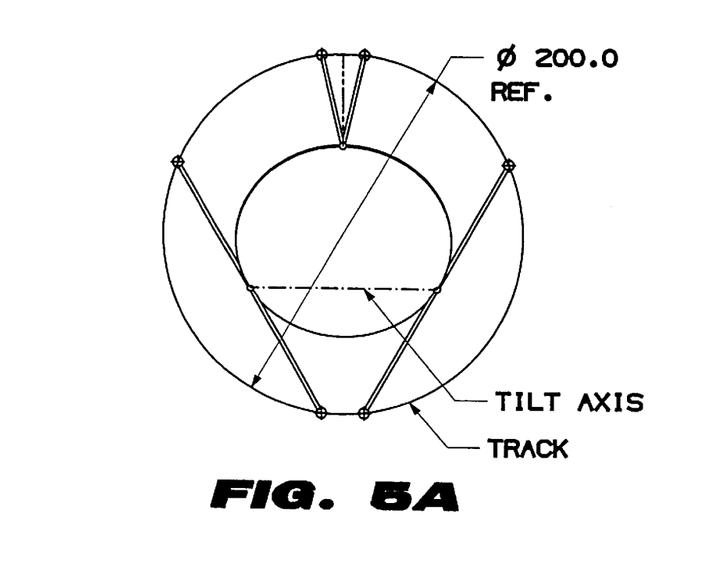
FIGS. 5A–5D depict schematically the embodiment of FIGS. 3A–3D wherein the working surface is in an inclined orientation relative to the reference surface.
Figure 5B:
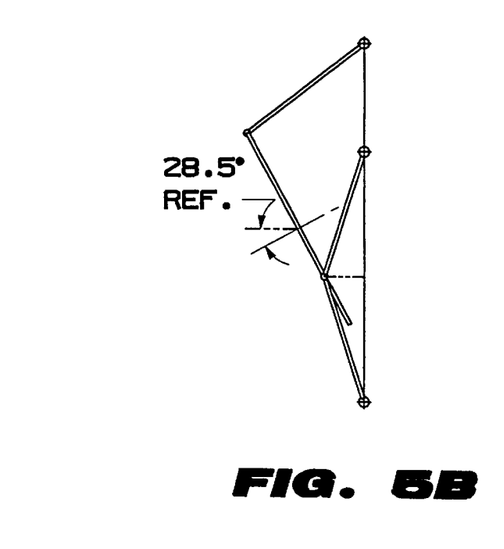
Figure 5C:
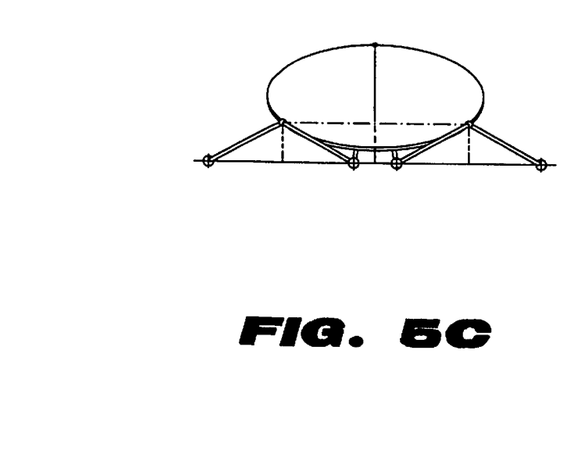
Figure 5D:
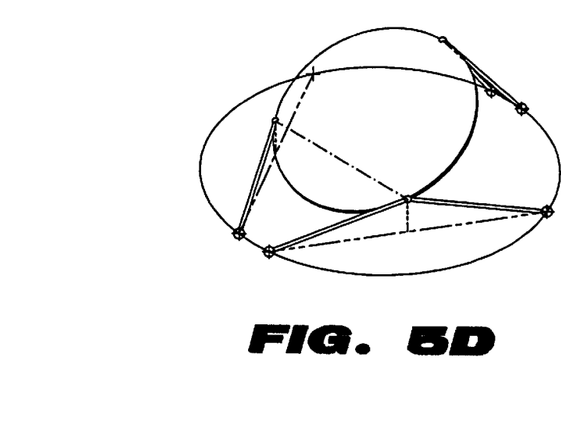
Figure 6A:
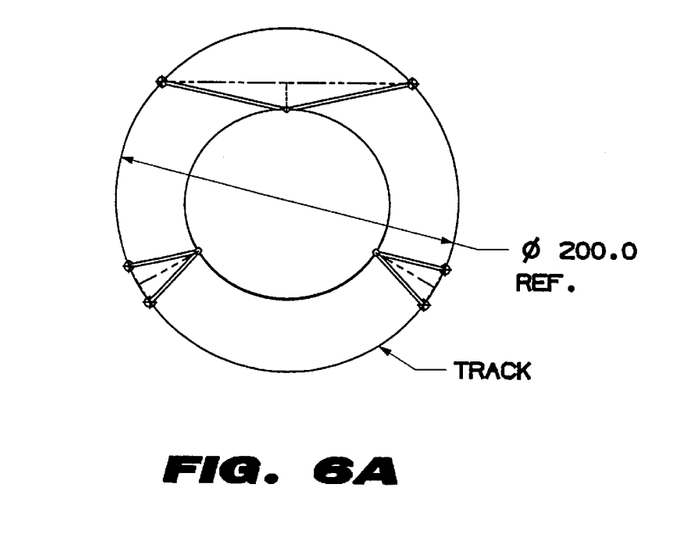
FIGS. 6A–6D depict schematically the embodiment of FIGS. 3A–3D wherein the working surface is tilted about a mounting point on the working surface.
Figure 6B:
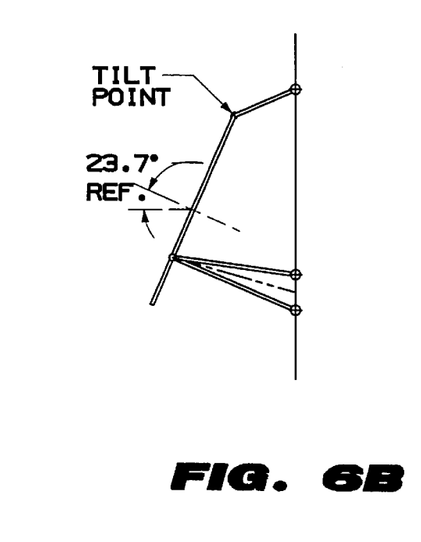
Figure 6C:
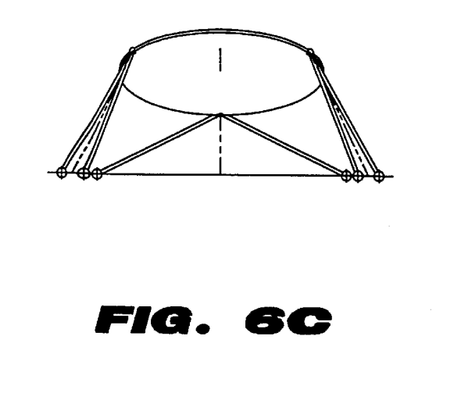
Figure 6D:
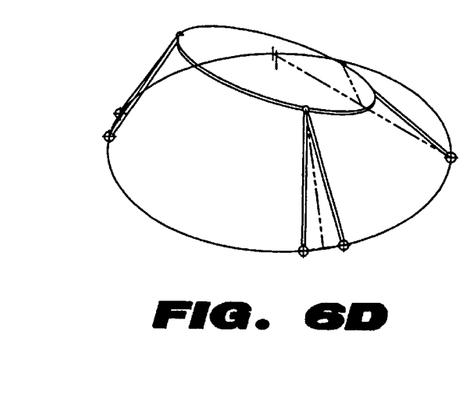
Figure 7A:
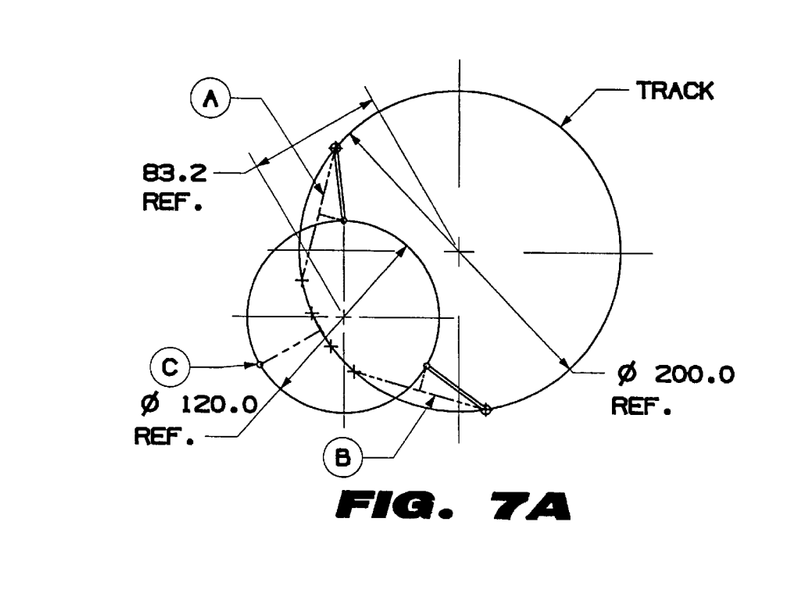
FIGS. 7A–7D depict schematically the embodiment of FIGS. 3A–3D wherein the working surface is in a parallel orientation and shifted position relative to the rotary track.
Figure 7B:
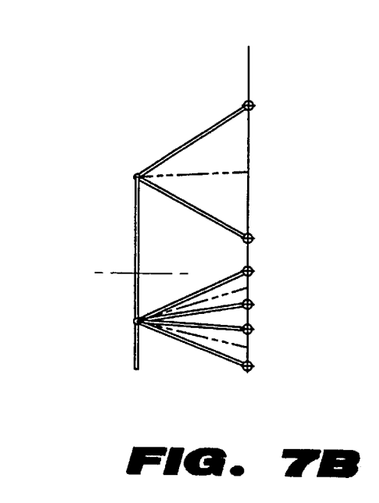
Figure 7C:
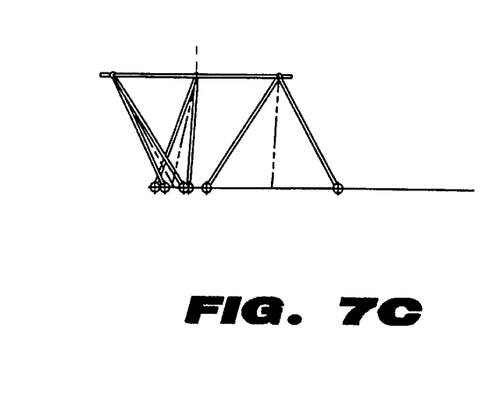
Figure 7D:
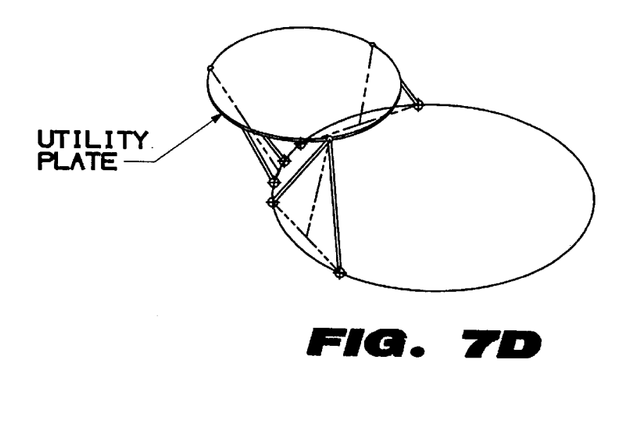

FIGS. 5A–5D depict schematically a utility plate in an inclined position at an angle such that a portion of the utility plate extends closer to the plane defined by the track than do any of the bi-strut universal joints. This illustrates a range of freedom of the machine 10 for inclining the utility plate, and the ability to incline the utility plate independent of fixed references. It will be understood that by moving the trucks relative to each other, the plate can be pitched, rolled and yawed. Accordingly, FIGS. 5A–5D depict that the plate can be tilted by raising one node of the plate relative to the other nodes. As FIG. 5D depicts, this can be achieved by spacing the trucks of one pair of push rods closer together than the trucks of the other pairs of push rods. Again, it will be understood that FIG. 5D depicts the plate in a static configuration, however, the trucks could move about the circular track to change the yaw of the plate.

FIGS. 6 and 7 depict still further dispositions of the utility plate. Specifically, FIGS. 6A–6D depict schematically a utility plate as inclined and raised. In particular, two of the bi-strut universal joints are shown to be raised substantially away from the plane defined by the circular track and one bi-strut universal joint is shown to be lowered in substantial proximity to the plane defined by the circular track. FIGS. 7A–7D show a utility plate in a non-inclined disposition and raised above a circular track, moved adjacent to the center of the track and positioned over one side of the track. In particular, these figures illustrate the invention's ability to position portions of the utility plate, including portions coupled to a bi-strut universal joint, beyond the bounds of the circular track.

Figure 8:
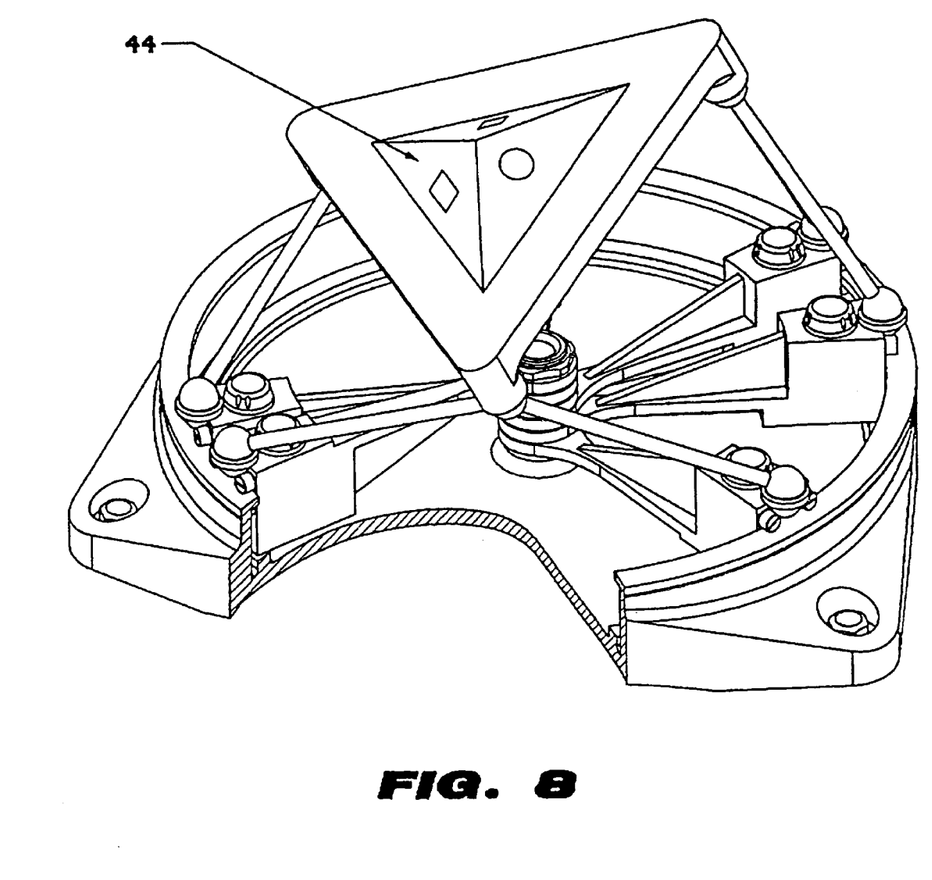
FIG. 8 depicts an alternative embodiment having a working surface supported by a plurality of legs carried by trucks moveably coupled to a rotary track and wherein the working surface has a pyramidal structure projecting outward and providing three faces, each face capable of carrying a different type of tool or end-effector.

FIG. 8 depicts an alternative embodiment of the invention that includes a pyramidal structure 44 disposed centrally on top of the utility plate 24. The pyramidal structure 44 can be a raised pyramidal structure having three equally sized faces, each face being capable of carrying a tool or other end-effector. Such tool or end-effector may be a machine tool, measurement device or other instrument. Given the unlimited yaw which can be achieved by the systems described herein, a machine 10 as shown in FIG. 8 can be advantages when placed within an assembly line. For example, each face of the pyramidal structure 44 can carry a separate tool. By taking advantage of the unlimited yaw provided by the systems shown herein, the system 10 can rotate into the assembly line the appropriate face of the pyramidal structure 44, carrying the selected tool, for the job at hand. In this way, the system 10 can be employed to provide access to multiple tools at a single location within an assembly line. It will be apparent to one of ordinary skill in the art that geometries other than pyramidal structures can be employed and are contemplated by the present invention without departing from the scope thereof.

Whereas the present invention is described in the foregoing by reference to particular embodiments, one skilled in the art will appreciate that the invention is not limited thereby, but that modifications and variations are possible without departure from the spirit and scope of the invention.

What is claimed is:

1. An apparatus for positioning and orienting an end-effector, comprising a working surface suitable for carrying an end-effector, a plurality of legs having proximal and distal ends, said distal ends of said legs being coupled to said working surface so as to permit changes in the angular orientation of each said leg relative to said working surface, a unitary track coupled to said proximal ends of said legs, wherein said unitary track is designed to enable substantially unlimited yaw of said working surface, and a controller for positioning said proximal ends of each of said legs, thereby controlling the three-dimensional location and orientation of said working surface.

2. Apparatus according to claim 1, wherein said unitary track is a rotary track.

3. Apparatus according to claim 1, wherein said unitary track enables movement of said working surface in three dimensions.

4. Apparatus according to claim 1, wherein said proximal ends of said legs include movable assemblies coupled to said unitary track.

5. Apparatus according to claim 1, wherein'said proximal ends include motorized truck assemblies coupled to said unitary track.

6. Apparatus according to claim 1, further comprising a motor assembly capable of moving each of said proximal ends across a surface.

7. Apparatus according to claim 1, wherein at least one of said proximal ends of said legs includes a position feedback device therefor for detecting a position of said proximal end on a surface.

8. Apparatus according to claim 1, wherein said plurality of legs includes pairs of legs each coupled at said respective distal ends to a node of said working surface and each coupled at its respective proximal end to a truck capable of moving across a surface.

9. Apparatus according to claim 1, further comprising a tool-support structure coupled to said working surface.

10. Apparatus according to claim 9, wherein said tool-support structure is a three-face pyramidal structure.

11. An apparatus for positioning and orienting an end-effector, comprising a working surface suitable for carrying an end-effector, a plurality of legs each having proximal and distal ends, said distal ends of said legs being coupled to said working surface so as to permit changes in the angular orientation of each said leg relative to said working surface, and a plurality of trucks coupled to a unitary track, wherein said unitary track is designed to enable substantially unlimited yaw of said working surface, each truck being coupled to the proximal end of one of said legs whereby the coordinated positioning of said trucks is effected to control the three-dimensional location and orientation of said working surface.

12. A rotatable Stewart platform, comprising a plurality of push rods having proximal and distal ends, a plurality of universal joints, each end of said push rods being coupled to a corresponding universal joint, a utility plate having a working surface and a plurality of attachment points, each attachment point being coupled to the distal universal joints of a pair of push rods such that the pair of push rods gimbal about the same distal point, a track, a plurality of trucks, each truck being coupled to the proximal universal joint of one of said push rods and moveably coupled to said track, said trucks being suitable for moving along said track whereby the motion of said trucks along said track defines a track plane, and an actuator for moving said trucks along said track, whereby the movement of said trucks along said track is effective to control the three-dimensional location and orientation of the working surface of said utility plate.

13. A rotatable Stewart platform assembly, comprising a utility plate having three attachment points and suitable for carrying an end-effector, three bi-strut universal joints, each being coupled to a corresponding utility plate attachment point, six push rods arranged in three pairs, each push rod having proximal and distal ends, the distal ends of each pair of said push rods being coupled to a corresponding bi-strut universal joint, six strut-end universal joints, each being coupled to the proximal end of a corresponding push rod, a support structure having a central hub, a circular track coupled to said support structure such that said circular track and the central hub are coaxial, six spokes, each said spoke having a first end rotatably coupled to the hub and a second end movably coupled to said circular track, the second end of each of said spokes being further coupled to a corresponding strut-end universal joint, an actuator for independently moving the second end of each of said spokes circumferentially along said circular track, whereby the positioning of the second end of each of said spokes about said circular track is effective to control the three-dimensional location and orientation of said utility plate.

14. A method for making a rotatable Stewart platform, comprising the steps of providing a plurality of pairs of push rods, each push rod having proximal and distal ends, providing one distal universal joint and one proximal universal joint for each of said push rods, coupling each distal universal joint to the distal end of a corresponding one of said push rods and coupling each proximal universal joint to the proximal end of a corresponding one of said push rods, providing a utility plate having a working surface and a plurality of attachment points, coupling each utility plate attachment point to said distal universal joints of a corresponding said pair of said push rods such that said pair of push rods gimbal about a common distal point, providing a track, providing one truck for each one of said push rods, coupling each said truck to a corresponding said proximal universal joint, moveably coupling each said truck to said track whereby said truck is suitable for moving along said track, and providing an actuator for moving said trucks along said track whereby the movement of said trucks is effective to control the three-dimensional location and orientation of the working surface of said utility plate.

* * * * *